United States Patent
Rakhovsky

(10) Patent No.: US 7,605,928 B2
(45) Date of Patent: Oct. 20, 2009

(54) TWO-DIMENSIONAL NANOPOSITIONER WITH CRUDE AND FINE STAGES

(76) Inventor: Vadim I. Rakhovsky, 1-y Botkinsky pr-d., 6-25, Moscow (RU) 125284

( * ) Notice: Subject to any disclaimer, the term of this patent is extended or adjusted under 35 U.S.C. 154(b) by 775 days.

(21) Appl. No.: 10/520,966

(22) PCT Filed: May 3, 2003

(86) PCT No.: PCT/RU03/00291
§ 371 (c)(1),
(2), (4) Date: Sep. 16, 2005

(87) PCT Pub. No.: WO2004/007144
PCT Pub. Date: Jan. 22, 2004

(65) Prior Publication Data
US 2006/0138871 A1   Jun. 29, 2006

(30) Foreign Application Priority Data
Jul. 11, 2002   (RU) ............................... 2002118561

(51) Int. Cl.
*G01B 11/14* (2006.01)
(52) U.S. Cl. .............................. 356/614; 310/12; 310/26
(58) Field of Classification Search ................. 356/614; 414/935, 936; 269/1, 3, 329, 63, 4, 55–59; 355/53.72; 310/12, 33, 26; 74/471 XY
See application file for complete search history.

(56) References Cited

U.S. PATENT DOCUMENTS

| | | | | |
|---|---|---|---|---|
| 4,422,002 A | | 12/1983 | Binnig et al. | |
| 4,575,942 A | * | 3/1986 | Moriyama | 33/1 M |
| 5,579,109 A | * | 11/1996 | Suh et al. | 356/487 |
| 5,623,853 A | * | 4/1997 | Novak et al. | 74/490.09 |
| 5,701,043 A | * | 12/1997 | Razzaghi | 310/26 |
| 6,281,654 B1 | * | 8/2001 | Lee | 318/649 |
| 6,437,463 B1 | * | 8/2002 | Hazelton et al. | 310/12 |

FOREIGN PATENT DOCUMENTS

| | | |
|---|---|---|
| DE | 42 26 072 A1 | 2/1993 |
| EP | 0 899 058 A2 | 3/1999 |
| RU | 2 065 245 C1 | 8/1996 |

* cited by examiner

*Primary Examiner*—Tarifur Chowdhury
*Assistant Examiner*—Michael Lapage
(74) *Attorney, Agent, or Firm*—RatnerPrestia

(57) ABSTRACT

The invention relates to accurate positioning devices which make it possible to displace an object within a nanometric range. The device includes a fixed foundation element (FE) provided with fine and crude positioning steps which are arranged thereon in such a way that they are reciprocatingly movable. The crude positioning step is kinematically connected to the FE and to the fine positioning step in such a way that they are synchronously movable with respect to the FE. The kinetic connection of the steps is embodied in such a way that the fine positioning step is autonomously movable with respect to the crude positioning step. Said steps are disposed in such a way that they are autonomously movable with respect to the FE and with respect to each other along two reference axes. The crude positioning step is embodied in a form of a rigid supporting plate, the fine positioning step being embodied in the form of a rectangular frame which is rigidly fixed to the plate. An executing mounting element is arranged inside the frame in such a way that it is movable and/or fixable in a specified position by nanometric positioning elements which are arranged on each side of the frame.

15 Claims, 1 Drawing Sheet

TWO-DIMENSIONAL NANOPOSITIONER WITH CRUDE AND FINE STAGES

Figure 1:
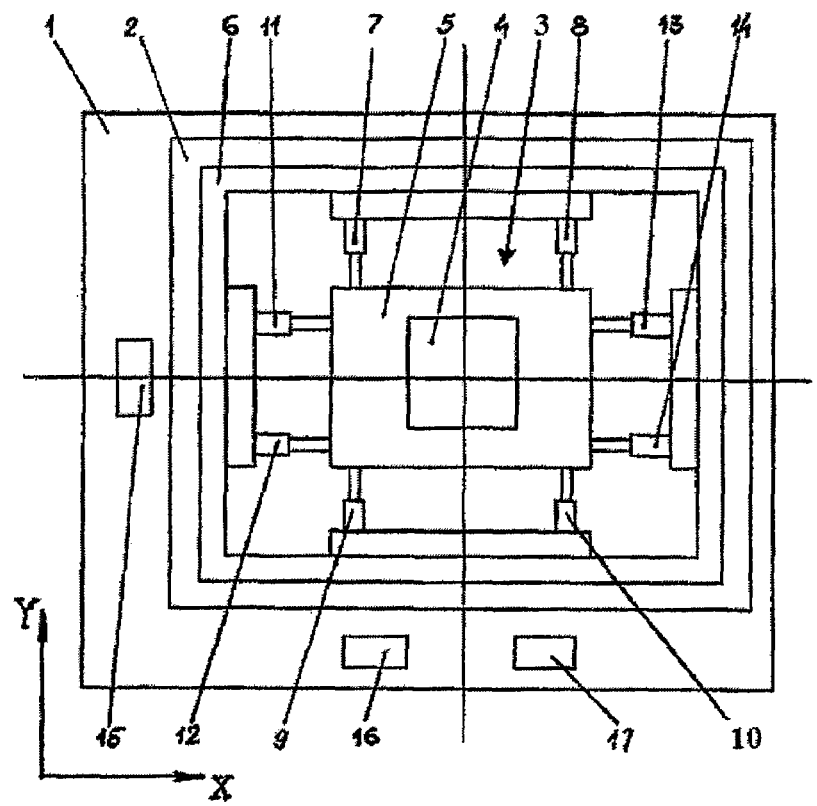

The invention is related to machine building, specifically to means of precision positioning, and can be used in, for instance, precision machining equipment, highly accurate copying devices, as well as in electronics industry and other areas of technology, predominantly to ensure discrete positioning of objects in the nanometer range, while allowing for moving said object at significant distances. The device consists of the foundation element with crude positioning stage traveling over it. Over the crude stage the fine positioning stage with an executing element is situated. The fine stage can travel back and forth over the crude stage. The crude stage is kinematically coupled to both the foundation element and the fine positioning stage, allowing both crude and fine stages to move independently relative to the foundation element. The kinematic coupling of the crude and fine positioning stages allows for autonomous movement of the executing element with regard to both crude stage and foundation element. The mounting of the crude and fine stages is such that it allows their respective movement along both coordinate axes of the plane. The crude stage is executed in the form of a rigid bearing plate carrying a rigidly fixed frame inside which the fine stage's executing element is situated. The executing element can move and be fixated at a particular point by pairs of nanometer range positioning elements attached to each of the four sides of the frame. The margin of error in the positioning of the crude stage is smaller than the range of fine stage positioning along either of the two coordinate axes. Using the described positioning device allows to move and position an object with discrete steps in the nanometer range, which increases reliability of measuring the actual position of an object and expands the usefulness of the device. Seven (7) formulae, two (2) figures.

The invention is related to machine building, specifically to means of precision positioning, and can be widely used in, for instance, precision machining equipment, highly accurate copying devices, as well as in the micro photolithography complexes of the electronics industry, as well as in other areas of technology, predominantly to ensure discrete step positioning of objects in the nanometer range, while allowing for moving said objects with regard to the base system of coordinates within the range of the base of no less than 160×160 mm.

Existing micro positioning devices are mostly utilizing precision linear motors (products of such companies as ASM Lithography, Canon, Nikon, Planar) or piezo-ceramic actuators (products of such companies as Burleigh, Toshiba, Physik Instrumente). The first group of devices allows for 35 nm positioning accuracy, while the second group reaches accuracies of 10 nm. Unfortunately, both these technologies are practically at the physical limits of improving their accuracy, which curtails further progress in microelectronics, optics, fine mechanics, precision machine building, micro- and robotic technologies, etc. Additionally, advances in piezo-ceramic positioners' accuracy requires radical improvement in the level of stabilization of high voltage power supplies they use, as well as lowering the number of micro defects in the piezo-ceramics, obtained by a baking process. Finally, both the range of movement and the forces developed in a number of cases prove to be way below what is needed in such rapidly developing technology areas as molecular biology, microelectronics, optics and, of course, precision machining.

Existing level of technology includes a magneto-mechanical device (nanometric screw, built on the basis of a magnetostrictive transducer), which includes the outer body and a fine positioning stage. That fine positioning stage includes an executing element at least partially made of magnetostrictive material, and is capable of moving back and forth, with controlling magnetic field originating from at least one permanent magnet placed in proximity to that part of at least partially made of magnetostrictive material executing element, and in such a way that it can be moved in relation to the latter (RU 2075797, 1997).

The closest analogy to the described immediately above technology solution is the known from existing level of technology nanometric device for positioning a movable object, which includes an immobile foundation element, on which two positioning stages—crude and fine—are mounted in a way which allows for their forward and backward movement with regard to the foundation element and to one another; crude positioning stage is coupled to the foundation element and to the fine positioning stage in a way which allows for synchronous movement of both stages relative to the foundation element, while the kinematic coupling between the two said stages is such that in the process of fine positioning the fine stage can move with regard to the crude stage and, correspondingly, to the foundation element as well (RU 20163 U, 2001).

The main drawback of the said known from existing level of technology magneto-mechanical device for positioning movable objects is the limited nature of the range of movement of the said object with the accuracy of displacement (discrete step) which the said known from existing level of technology magneto-mechanical positioning device is capable of assuring. Additionally, this known from existing level of technology device is limited in its usability due to the fact it can only position an object moving along one of the coordinate axes only, nor does it contain corresponding means of measurement and control which possess the accuracy required to function in the stated range of the object's movement.

The basic value of the reported invention is that it offers a solution to the problem of designing a device for such displacements of a movable object by a given distance (over the range of no less than 160 mm) with regard to the base system of coordinates, which would ensure the possibility of two dimensional positioning of the movable object with nanometric accuracy, i.e. would ensure displacements of the object by a discrete step in the nanometer range (with regard to the base system of coordinates), significantly surpassing reliability of the known from existing level of technology means and methods of measuring the actual position of the movable object in question, and which expands the usability of the device.

Solution to the above stated task is based on the design of a nanometric positioning device which includes an immobile foundation element, on top of which a crude positioning stage is mounted in a way allowing for forward and backward movement with regard to the foundation element; on top of the crude stage is mounted a fine stage incorporating an executing element. The crude stage is kinematically coupled to both the foundation element and to the fine positioning stage in a way which allows for the movement of both stages relative to the foundation element, while the kinematic coupling between the said two stages is such that in the process of fine positioning the fine stage can move with regard to the crude stage and, correspondingly, to the foundation element as well. The crude and fine stages are mounted on top of the foundation element in a way which allows for the above mentioned movement along the two coordinate axes. The crude stage is executed in the form of a rigid base plate, upon which a frame is rigidly affixed. Inside that frame is the fine stage executing element which allows for movement and fixating at a given point by way of pairs of nanometric range positioning elements attached to each of the four sides of the rectangular frame. The positioning error of the crude stage is made smaller than the range of movement of the fine stage along each one of the two coordinate axes.

It is optimal to execute the pairs of nanometric range positioning elements in the form of magnetostrictive transducers, which contain means to create and control (change) magnetic field. The source of the latter can be chosen to be permanent magnets. Magnetic field can also be created and modified for the said purpose by utilizing electromagnetic coils.

Kinematic coupling of the foundation element and the crude positioning stage can be ensured by at least two precision linear motors attached to the foundation element in such a way as to provide for moving the rigid base plate of the crude stage along the two coordinate axes.

The nanometric positioning device can be equipped with mechanisms providing for moving the rigid base plate of the crude stage on a cushion of air.

The foundation element can be equipped with vacuum suction fixers for the fixation of the crude stage.

The nanometric positioning device can also be equipped with a measurement and control system of the positioned object which includes, at least, three measurement and control elements with the accuracy of not lower than the precision of positioning of the said executing element of the fine stage; one of these three measuring elements must be situated so as to allow for control of the object's linear position along one of the coordinate axes, and the others in a way allowing for linear-polar control with regard to the other orthogonal coordinate axis in the plane of the foundation element. The nanometric positioning device can also be equipped with a system controlling positioning elements providing for the displacement of the executing element of the fine stage by a given distance; such a system can be linked to the object's measurement and control system described above.

It is expedient to use laser heterodyne interferometers and/or capacitance sensors for measuring positioning stages' deviation from the plane of the foundation element for the said system of measurement and control.

The invention is illustrated by graphical exhibits.

Figure 2:
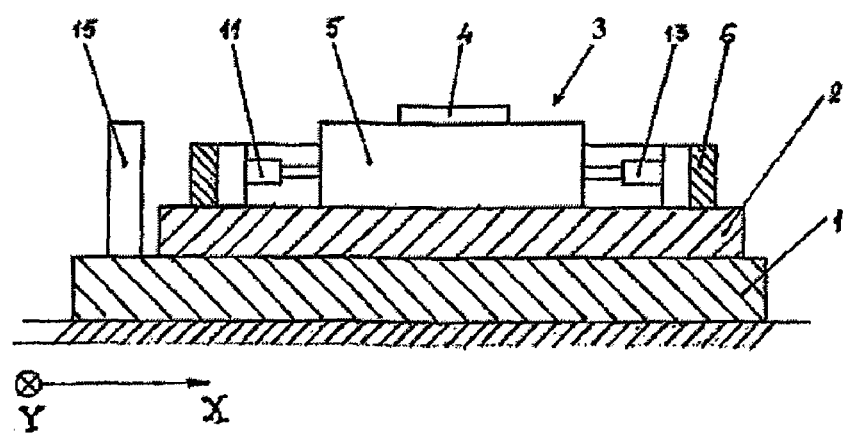

FIG. 1 presents the schematic design of the nanometric positioning device (view from the top);

FIG. 2—cross section of FIG. 1 along the A-A plane.

The nanometric positioning device contains an immobile foundation element "1", on top of which two object "4" positioning stages—crude "2" and fine "3"—are attached in a way allowing for both forward and backward movement with regard to the foundation element "1" and to one another. The crude positioning stage "2" is kinematically coupled to the foundation element and to the fine positioning stage in a way which allows for synchronous movement of both stages "2" and "3" relative to the foundation element "1" in the process of crude positioning of the object "4". The kinematic coupling between the two said stages "2" and "3" allows for the autonomous movement of the fine stage's "3" executing element "5" (designed to move the object "4" into a desirable position) with regard to the crude stage "2" and, correspondingly, to the foundation element "1" in the process of fine positioning of the object "4". The crude "2" and fine "3" stages are mounted on top of the foundation element "1" in a way which allows for the backward and forward movement along the two coordinate axes X and Y with regard to the foundation element "1" and to one another. The crude stage "2" is executed in the form of a rigid base plate, upon which a frame "6" is rigidly affixed. Kinematic coupling of the crude positioning stage "2" and foundation element "1" is realized by at least two precision linear motors (not shown in the drawings) attached to the foundation element in such a way as to provide for moving the rigid base plate of the crude stage along the two coordinate axes. Such movement, i.e. displacement of the base plate during the crude positioning of object "4", is realized by using an air cushion. The foundation element "1" can be equipped with fixating mechanisms, which usually operate by vacuum suction, for the fixation of crude stage "2".

The fine positioning stage "3" is placed inside a frame "6" rigidly fixed to the crude stage's "2" base plate; inside the frame "6" is the executing element "5". This executing element "5" can be moved and fixated at a given point by way of pairs of nanometric range positioning elements "7", "8", "9", "10", "11", "12", "13", and "14" on each of the four sides of the rectangular frame "6". Additionally, the nanometric positioning device is equipped with a measurement and control system of the positioned object "4" which includes at least three measurement and control elements "15", "16" and "17" with the accuracy of not lower than the positioning precision of positioning elements "7", "8", "9", "10", "11", "12", "13", and "14" of the fine stage "3". One of these three measuring elements "15" is situated so as to allow the object's "4" linear position control along one of the coordinate axes (e.g. X), and the others "16" and "17" with regard to the other coordinate axis (Y).

Positioning elements "7", "8", "9", "10", "11", "12", "13", and "14" of the fine stage "3" can be executed in various forms, but the best mode is to use magnetostrictive (magnetomechanical) transducers with permanent magnets as means of creating and modifying magnetic field. It must be noted that magnetostrictive transducers used in the submitted device are characterized by using as its power element (mean of displacing the executing element) a rod made of material possessing the quality of giant magnetostriction (magnetostrictor) placed into magnetic field created by a magnetic system composed of permanent magnets. As magnetic field created by the magnetic system changes in its intensity or orientation, the linear dimensions of the magnetostrictor also change. Utilization of a magnetic system composed of permanent magnets has advantages in comparison to the widely used magnetostrictive transducers where magnetic field is created and controlled by electromagnetic coils; among such advantages are significantly lower energy consumption by the magnetostrictive transducer, which allows to eliminate its heating, increase temporal stability of the executing element position, and in many cases do without a source of electricity altogether.

As a result of choices made submitted device has the following operational parameters:

| | |
|---|---|
| Minimal step of displacement (positioning) | 0.01 nm; |
| Positioning range | up to 1,000 mm along each axis; |
| Dynamic range | $10^{11}$; |
| Force realized by the executing element in the process of displacement | $10^4 \, N^1$; |
| Power sonsumption when the device is active Zero power required when the executing element is stationary. | up to 5 W; |

[1]Each square millimeter of the strictor rod cross section generates the force of ~10 Kg. Conseqently, a strictor rod of 1 cm² will generate the push of 7, 85 103 N ≈ $10^4$ N.

The means of measuring "15", "16", and "17" of the object "4" measurement and control system can rely, predominantly, on laser heterodyne interferometers; the usage of capacitance sensors for measuring and eliminating positioning stages' longitudinal deviation from the plane of the foundation element is not excluded either.

It must be underlined the measurement and control system for positioning object "4" must ensure determination of fine stage position with a dynamic range of ~$10^8$. Such precision can only be achieved through the use of laser interferometric displacement measuring devices. Laser interferometer for measuring displacements is a linear measuring system for determining absolute distance values by comparing them to the wavelength of a frequency stabilized laser. The underlying general principle of how a displacements measuring laser interferometer functions is that one of its reflectors is attached to the object being positioned "4"; as the latter is moved, the phase difference of the interfering light beams changes, producing characteristic periodic pattern of modulating amplitude of light at the output of the interferometric device. The period of the observed interference picture is exactly equal to one half of the laser radiation wavelength, which can be known with very high precision. Thus, measuring a linear displacement with an interferometer is reduced to counting the number of complete interferometric stripes and determining and adding the contribution of a stripe's fraction. Thus, the measurement and control system for the location of the object "4" has to consist of two interferometric displacement measurement devices: one, working either as a highly precise measurement ruler, or on the principles of an interferometer without signal transfer, would measure the number of complete interferometric stripes; the other (heterodyne) interferometer measures the contribution of the fraction of a stripe.

In the submitted device (nanotable) positioning (displacement) is realized by utilizing two stages: crude stage "2" and fine stage "3" situated on top of "2". An essential issue is the problem of longitudinal deviations of fine stage "3" as it moves along each of the coordinate axes X and Y in the process of the displacement of fine stage's "3" executing element "5". To address this issue capacitance sensors put into a negative feedback loop are used to control fine stage's "3" position with regard to the coordinates orthogonal to the direction of its movement; deviations of not more than 50 nm and accuracy of positioning reproducibility of 2.5 nm in the plane orthogonal to the direction of fine stage's "3" movement are achieved. The positioning accuracy of no more than 3 nm along the axis of fine stage's "3" movement is achieved through using interferometric measuring device of the stripe's fractional part. It is assumed the device works in a vacuum, or that the atmosphere in which it works has a stable refraction coefficient to the accuracy of $10^{-8}$.

As stated, an effective method to eliminate possible longitudinal deviations of stages "2" and "3" is usage of capacitance sensors to measure and control the skewing of a stage. Capacitance sensors provide very high accuracy of measuring small distances. A "distance difference/capacitance" transducer consists of two electro-conductive surfaces, attached to an immobile reference surface, and separated from the latter (e.g. with a layer of dielectric) by a distance ~1 mm, as well as a bearing surface longer and wider than the distance between said reference surfaces, positioned on the chosen guide.

Thus two condensers are formed by the electro-conducting bearing surface on the one hand, and the reference surfaces on the other. Information generating parameter here is the distance between these surfaces. As a stage skews, these two distances experience different changes, producing a change of electric charge on the condenser plates and an electric signal proportional to the degree of skewing (with plus or minus sign depending on the direction of skewing) is generated.

The most acceptable method of transforming a change in capacitance into an electric signal is the bridge transformer method for measuring capacitance with tight mutual inductive link between measuring "shoulders." In such a case precision of the measurement is ensured by the stability of transformation coefficient between the "shoulder" coils with this parameter depending only on the ratio of the number of winds in the coils and, consequently, is not affected by any changes in the environment.

The most efficient mode of operation of the transformer measuring circuit described is the resonant mode. Its advantages are:

Coefficient of the bridge transformation increases proportional to the Q-factor of the contour;

Immunity to electromagnetic interference is increased due to the frequency selectivity of the resonance mode.

Utilization of the resonant measurement circuit enables the usage of a synchronous amplitude phase sensitive detector—a device transforming changing voltage into a constant one in synchronous mode. This significantly improves metrological characteristics of the measuring circuit, above all the linearity of transformation characteristics. Additionally, stability with regard to unfavorable environmental factors is improved, e.g. to immunity to currents bleeding over insulator surfaces due to the suppression of the active component of the measuring circuit conductivity, as well as resistance to interference.

The working frequency of the generator in such a case is kept close to the bridge's resonant frequency by means of an automatic phase based system of frequency fine tuning, which generates an error signal due to using phase manipulated pilot signal. Design of the measuring transformer can be based on a transformer with short-circuited linkage coil, ensuring high separation of the input and output bridge circuits with regard to the throughput capacitance. The resonance mode will provide for a high and constant transformation coefficient across the desired range of measured difference in capacitance.

In order to assure resonant mode across the whole range of changing sensor capacitance and to lower quality requirements for off-the-shelf equipment's fine tuning, the measuring generator and the bridge network can be incorporated into a system of phase based frequency auto-tuning. In that case the output coil of the bridge circuit will load the key synchronous detector, providing for the circuit's required linearity characteristics across the full range of measured sensor capacitance and an adequately high immunity to electromagnetic interference. The necessary steepness of the throughput characteristics are ensured through the use of a scaling amplifier based on an op-amplifier design. The scaling coefficient and, consequently, the steepness of the transformation can be set during fine tuning of the circuit by adjusting the value of the tuning resistor.

The novelty of the technical solution proposed is in the utilization of:

unique power nanopositioners guiding the fine positioning stage of the nanotable to a point at pre-set coordinates;

high precision heterodyne interferometer for reliable measurements of the fractional component of interferometric stripes in the process of determining the position of fine positioning stage of the nanotable;

high sensitivity capacitance displacement sensors helping to get rid of longitudinal deviations in the process of displacing nanotable's fine positioning stage, which should dramatically decrease the time required for fine tuning the device and thus increase its usability.

The crude positioning stage "2" allows to move object "4" to a desired point within the range of at least 160 mm in the plane of the foundation element "1" (along each of the X and Y coordinate axes) with an approximate accuracy of 3μ, providing for object "4" positioning with a dynamic range of $5 \times 10^4$. The fine positioning stage "3" (specifically, its executing element "5") moves over the XY plane within the range of approximately 10-20μ$^2$, with the capability of discrete steps of less than 0.1 nm. Stated accuracy of discrete displacements of fine stage's "3" executing element "5" which positions object "4" is achieved by four pairs of superprecise power positioners, predominantly magnetostrictive (i.e. the nano range positioning elements "7", "8", "9", "10", "11", "12", "13", and "14"). All the above provides for device's dynamic range of $2 \times 10^5$. The fine stage "3" assures positioning accuracy of object "4" (within the foundation element plane) of no worse than 5 nm along each of the coordinate axes X and Y.

It is fully realistic that the above described control and measurement system (i.e. the system of controlling positioning stages "2" [crude] and "3" [fine] within the XY plane) for the positioned object "4", based on bi-coordinate measuring system utilizing laser heterodyne interferometers and the above described capacitance sensors, allows to measure and control positioning of stage "3" within XY plane across the full range along both coordinate axes with an approximate accuracy of 1 nm.

As already stated, the crude stage "3" positioning object "4" is executed in the form of a rigid plate movable (in the process of crude positioning of object "4") with regard to the foundation element "1" on an air cushion; it can be executed in any number of ways known from existing level of technology by mean of at least two linear motors. The accuracy of such crude positioning achieved by precision linear motors known from existing level of technology is approximately 2-3μ over the range of 0.1-1.0 meter. Upon arriving at the designated coordinates, crude stage "2" is rigidly fixed to the surface of the foundation element "1" by means of any known from existing level of technology system of vacuum suction.

After that the final positioning of object "4" is executed by the fine positioning stage "3" kinematically coupled to crude stage "2", which at that time is rigidly fixed to the surface of the foundation element "1".

As already stated, fine positioning stage "3" at "that time" is synchronously moving together with the rigid plate of the crude positioning stage "2".

Next, superprecise positioning of the executing element "5" (of the fine positioning stage "3") along coordinates X and Y takes place. Said superprecise displacement of the executing element "5" along either of the axes X or Y is realized with the involvement of only those two pairs of positioning elements which oppose each other (e.g. elements "7", "8" and "9", "10" correspondingly, when executing element "5" is moving along the Y axis), and assuming the other two pairs of positioning elements ("11", "12" and "13", "14" in this case) are not in contact with the executing element "5" as it moves along axis Y. When the executing element "5" moves along axis X, stated pairs of positioning elements operate (as far as interaction with the executing element "5" is concerned) in the opposite order.

Described positioning process is governed by a program which drives a computer.

When magnetostrictive transducers (nanopositioners) are utilized as positioning elements "7", "8", "9", "10", "11", "12", "13", and "14", extension or contraction of each one of the said eight elements is resulting from a change in the value of magnetic field enveloping magnetostrictive rods of corresponding magnetostrictive positioners. One of the two opposing pairs of positioners, specifically the one on the side of the executing element "5", can be realized as springs (rather than magnetostrictive transducers).

Characteristics of the local magnetic field (and, specifically, its strength) in the immediate vicinity of the magnetostrictive element of a corresponding transducer is controlled by a computer running a program, which, in order to make the fine positioning stage "3" reach specified coordinates, must use as dynamic input data on the running coordinates of fine stage "3" measured by a special system of interferometric measurement and control of the positioned object "4"; as stated above, such a measuring and control system includes at least three heterodyne interferometers, providing for determination of both X and Y coordinates with adequate accuracy.

Thus, bringing the fine positioning stage "3" to the specified coordinates is achieved in the following way.

After the crude positioning stage controlled by two interferometers oriented along axes X and Y in order to avoid possible "skewing" is brought to specified coordinates with an accuracy of ~3μ, the plate of crude positioning stage is fixated on the surface of the foundation element. Then the strictors, responding to their computer controlled (the computer is driven by a program which is fed in real time dynamic data on the running coordinates of the fine positioning stage obtained through interferometric measurements) magnetic systems, which change local magnetic field values in the strictor's immediate vicinity, finalize precise positioning of the fine stage with discrete step of ~0.1 nm over a range of 10-20μ, all under continuous interferometric control, assuring positioning precision of no worse than 5 nm.

Thus, submitted positioning device can be implemented industrially to provide for positioning of different objects with position accuracy (discrete positioning step) of no more than 5 nm. This opens qualitatively new technological opportunities in the fields of microelectronics, building optical apparatus, in precision machine building, etc. Consequently, submitted technical solution can serve as a foundation for the creation of a new generation of superprecise equipment for such technological processes as cutting, engraving, planning, drilling, etc., as well as equipment complexes for photolithography, X-Ray, and electron beam lithography, which are used in the microelectronic and printing industries.

Utilization of the submitted nanopositioner can empower the development of a new generation of precision equipment for technological processes as cutting, engraving, planning, drilling, etc., as well as positioning tables for super precise photogrammetric installations, new generation of holographic equipment, installations for the production of fine diffraction grids, in photo, X-Ray and electron beam lithography complexes, allowing to radically increase the degree of component integration (miniaturization of elements), for instance in microprocessors ("microchips").

Invention Formula

1. Nanometric positioning device containing a foundation element with attached crude positioning stage capable of backward and forward travel with regard to it. On top of the crude stage is attached a fine positioning stage with an executing element and capable of backward and forward travel with regard to the crude stage. Crude positioning stage is kinematically coupled to the foundation element as well as coupled to the fine positioning stage, allowing both crude and fine stages to move independently with respect to the foundation element. The kinematic coupling of the crude and fine positioning stages allows for autonomous movement of the executing element with regard to both crude stage and, correspondingly, to the foundation element. The mounting of the crude and fine stages is such that it allows their respective movement along both coordinate axes of the plane. The crude stage is executed in the form of a rigid bearing plate carrying a rigidly fixed frame inside which the fine stage's executing element is situated. The latter can move and be fixated in a given position by mean of pairs of nanometer range positioning elements on each one of the four sides of the frame. The margin of error in the positioning of the crude stage is smaller than the range of fine stage positioning along either of the two coordinate axes.

2. Nanometric positioning device according to #1 above but differing in that positioning elements are realized in the form of magnetostrictive transducers.

3. Nanometric positioning device according to #1 or #2 above but differing in that kinematic coupling of the crude positioning stage with the foundation element is realized in the form of at least two precision linear motors, providing for displacing the rigid plate of the crude positioning stage along both corresponding coordinate axes.

4. Nanometric positioning device according to #3 above but differing in that it is equipped with the means of moving the rigid plate of the crude positioning stage along both corresponding coordinate axes on an air cushion.

5. Nanometric positioning device according to any of the ##1-4 above but differing in that the foundation element is equipped with means of fixating the crude positioning stage using the principle of vacuum suction.

6. Nanometric positioning device according to any of the ##1-5 above but differing in that it is equipped with a system of measurement and control of the positioned object, which includes at least three measurement and control devices with accuracy no worse than the accuracy of positioning assured by the positioning elements; one of the said measuring and control devices is situated so it allows for linear control and measurement of the object's position along one of the coordinate axes, while the others in a way that allows for linear-polar control and measurement of the object's position with regard to the other one of the orthogonal coordinate axes in the foundation element's plane.

7. Nanometric positioning device according to #6 above but differing in that it is equipped with a system of controlling positioning elements, which allow for the displacement of the positioned object over a specified distance by executing element of the fine positioning stage, which is coupled to the system of measurement and control of the positioned object location.

8. Nanometric positioning device according to #6 or #7 above but differing in that the means of measurement and control of the measurement and control system for the location of positioned object are realized in the form of laser heterodyne interferometers and/or capacitance sensors of the deviation of the crude and fine positioning stages' position relative to the foundation element plane.

The invention claimed is:

1. A nanometric positioning device containing a foundation element attached to a crude positioning stage capable of backward and forward travel with regard to the foundation element, wherein:

on top of the crude positioning stage is attached a fine positioning stage with an executing element and capable of backward and forward travel with regard to the crude positioning stage;

the crude positioning stage is kinematically coupled to the foundation element as well as coupled to the fine positioning stage, allowing both the crude positioning stage and the fine positioning stage to move independently with respect to the foundation element;

the kinematic coupling of the crude and fine positioning stages allows for autonomous movement of the executing element with regard to both crude positioning stage and, correspondingly, to the foundation element;

the mounting of the crude positioning stage and fine positioning stage is such that it allows for the respective movement of the crude positioning stage and the fine positioning stage along both coordinate axes of a plane of the foundation element;

the crude positioning stage is executed in the form of a rigid bearing plate carrying a rigidly fixed rectangular frame inside which the fine positioning stage's executing element is situated;

the fine positioning stage can move and be fixed in a given position by means of pairs of nanometer range positioning elements, one pair of the nanometer range positioning elements on each one of the four sides of the rigidly fixed rectangular frame;

the pairs of the nanometer range positioning elements comprising either i) four pairs of magnetostrictive transducers or ii) two pairs of magnetostrictive transducers and two pairs of springs; and positioning of the crude positioning stage margin of error is smaller than the range of fine stage positioning along either of the two coordinate axes.

2. The nanometric positioning device according to claim 1, wherein kinematic coupling of the crude positioning stage with the foundation element comprises at least two precision linear motors, adapted for displacing the rigid bearing plate of the crude positioning stage along both coordinate axes.

3. The nanometric positioning device according to claim 2, wherein the device is equipped with the means of moving the rigid plate of the crude positioning stage along both corresponding coordinate axes on an air cushion.

4. The nanometric positioning device according to claim 1 wherein the foundation element comprises means of fixating the crude positioning stage using the principle of vacuum suction.

5. The nanometric positioning device according to claim 1, wherein the device comprises a system of measurement and control of the positioned object, which includes at least three measurement and control devices with an accuracy not less than the accuracy of positioning provided by the positioning elements; one of the said measuring and control devices is situated so as to allow for linear control and measurement of the object's position along one of the coordinate axes, while the others in a way that allows for linear-polar control and measurement of the object's position with regard to the other one of the orthogonal coordinate axes in the foundation element's plane.

6. The nanometric positioning device according to claim 5, wherein the device comprises a system of controlling positioning elements, which allows for the displacement of the positioned object over a specified distance by the executing element of the fine positioning stage, which is coupled to the system of measurement and control of the positioned object location.

7. The nanometric positioning device according to claim 5, wherein the means of measurement and control of the measurement and control system for the location of positioned object comprises laser heterodyne interferometers and/or capacitance sensors of the deviation of the crude and fine positioning stages' position relative to the foundation element plane.

8. The nanometric positioning device according to claim 1, wherein kinematic coupling of the crude positioning stage with the foundation element comprises at least two precision linear motors, adapted for displacing the rigid bearing plate of the crude positioning stage along both coordinate axes.

9. The nanometric positioning device according to claim 8, wherein the device comprises means of moving the rigid bearing plate of the crude positioning stage along both corresponding coordinate axes on an air cushion.

10. The nanometric positioning device according to claim 9 wherein the foundation element comprises means of fixating the crude positioning stage using the principle of vacuum suction.

11. The nanometric positioning device according to claim 10, wherein the device comprises a system of measurement and control of the positioned object, which includes at least three measurement and control devices with an accuracy not less than the accuracy of positioning provided by the positioning elements; one of the said measuring and control devices is situated so as to allow for linear control and measurement of the object's position along one of the coordinate axes, while the others in a way that allows for linear-polar control and measurement of the object's position with regard to the other one of the orthogonal coordinate axes in the foundation element's plane.

12. The nanometric positioning device according to claim 11, wherein the device comprises a system of controlling positioning elements, which allows for the displacement of the positioned object over a specified distance by executing element of the fine positioning stage, which is coupled to the system of measurement and control of the positioned object location.

13. The nanometric positioning device according to claim 12, wherein the means of measurement and control of the measurement and control system for the location of positioned object comprises laser heterodyne interferometers and/or capacitance sensors of the deviation of the crude and fine positioning stages' position relative to the foundation element plane.

14. A nanometric positioning device comprising:
  a foundation element including a rigid bearing plate on which is disposed a rigidly fixed frame having four interior walls contiguous with one another;
  a crude positioning stage kinematically coupled to the foundation element and capable of travel along both coordinate axes of a plane with respect to the foundation element;
  a fine positioning stage kinematically coupled to the crude positioning stage, the fine positioning stage including an executing element disposed within the rigidly fixed frame, the fine positioning stage adapted for independent travel along said both coordinate axes of the plane respect to the crude positioning stage; and
  a plurality of pairs of nanometer range positioning elements coupled to respective ones of the four contiguous walls of the frame such that the fine positioning stage can move and be fixed in a given position by said plurality of pairs of nanometer range positioning elements,
  wherein both the crude positioning stage and the fine positioning stage are adapted to move independently with respect to a plane of the foundation element,
  the kinematic coupling of the crude and fine positioning stages allows for autonomous movement of the executing element with respect to both crude positioning stage and the foundation element, and
  a margin of error for positioning the crude positioning stage is smaller than the range of fine positioning stage along either of the two coordinate axes.

15. The nanometric positioning device according to claim 14, wherein the plurality of pairs of nanometer range positioning elements comprise either i) four pairs of magnetostrictive transducers or ii) or two pairs of magnetostrictive transducers and two pairs of springs.

* * * * *